United States Patent [19]

Moriki

[11] Patent Number: 5,086,666
[45] Date of Patent: Feb. 11, 1992

[54] SHIFT CONTROL SYSTEM FOR AN AUTOMATIC TRANSMISSION

[75] Inventor: Daisaku Moriki, Hiroshima, Japan

[73] Assignee: Mazda Motor Corporation, Hiroshima, Japan

[21] Appl. No.: 544,540

[22] Filed: Jun. 27, 1990

[30] Foreign Application Priority Data

Jun. 30, 1989 [JP] Japan .................... 1-170655

[51] Int. Cl.⁵ .................................... B60K 41/08
[52] U.S. Cl. .................................... 74/857; 74/851; 74/872; 364/424.1
[58] Field of Search ............... 74/866, 851, 854, 855, 74/858, 860, 872, 857; 364/424.1

[56] References Cited

U.S. PATENT DOCUMENTS

| | | | |
|---|---|---|---|
| 3,556,064 | 1/1971 | Yamazaki | 74/860 X |
| 4,246,805 | 1/1981 | Umezawa | 74/851 |
| 4,283,970 | 8/1981 | Vukovich | 74/866 |
| 4,355,550 | 10/1982 | Will et al. | 74/858 X |
| 4,370,903 | 2/1983 | Stroh et al. | 74/851 X |
| 4,370,904 | 2/1983 | Müller et al. | 74/858 |
| 4,403,527 | 9/1983 | Mohl et al. | 74/851 |
| 4,467,673 | 8/1984 | Hamada et al. | 74/860 |
| 4,611,507 | 9/1986 | Burkel et al. | 74/866 |
| 4,691,285 | 9/1987 | Takeda | 74/866 X |
| 4,724,723 | 2/1988 | Lockhart et al. | 74/854 |
| 4,788,890 | 12/1988 | Anderson | 74/851 |
| 4,792,902 | 12/1988 | Hrovat et al. | 74/851 X |
| 4,800,781 | 1/1989 | Yasue et al. | 74/851 X |
| 4,924,832 | 5/1990 | Abe | 74/860 X |
| 4,933,851 | 6/1990 | Ito et al. | 74/858 X |

FOREIGN PATENT DOCUMENTS 61-104128 5/1986 Japan .

Primary Examiner—Richard Lorence
Assistant Examiner—David E. Henn
Attorney, Agent, or Firm—Sixbey, Friedman, Leedom & Ferguson

[57] ABSTRACT

A shift control system for an automatic transmission of a vehicle controls the output of the engine according to the running condition of the vehicle when gear-shifting operation of the automatic transmission is detected. A shifting condition signal representing an actual value of the running condition during a gear-shifting operation is compared with a reference value signal representing a reference value of the running condition during the gear-shifting operation, and a correction signal is output on the basis of the result of the comparison. The controlled variable of the engine output power is corrected on the basis of the correction signal.

7 Claims, 6 Drawing Sheets

SHIFT CONTROL SYSTEM FOR AN AUTOMATIC TRANSMISSION

BACKGROUND OF THE INVENTION

1. Field of the Invention

This invention relates to a shift control system for an automatic transmission.

2. Description of the Prior Art

An automatic transmission generally comprises a torque converter and a multi-gear ratio transmission gear mechanism connected to the torque converter. The transmission gear mechanism is provided with hydraulic frictional elements which are selectively applied and released in order to shift transmission gear ratios.

When the shift-time taken to shift one gear ratio to another is too long, the driver feels uncomfortable and the running performance of the vehicle deteriorates. On the other hand, when the shift-time is too short, shift shock occurs. Accordingly, the shift-time should be carefully controlled.

In the shift control system disclosed in U.S. Pat. No. 4,283,970, the line pressure is controlled in order to adjust the shift-time. That is, in the shift control system, the basis line pressure is corrected depending on the length of the shift-time.

In the shift control system disclosed in Japanese Unexamined Patent Publication No. 61(1986)-104128, the engine output power is reduced for a predetermined time when the transmission shifts in order to suppress shift shock.

Though the system which corrects the basic line pressure is advantageous in view of the suppression of the shift shock, it needs additional line pressure control means such as solenoids, which results in substantial cost increases. Further, the system which reduces the engine output power is for suppressing fluctuation in torque during the gear-shifting and does not control the shift-time, and is not satisfactory in view of an optimal shift control.

SUMMARY OF THE INVENTION

In view of the foregoing observations and description, the primary object of the present invention is to provide a shift control system for an automatic transmission in which the shift-time can be controlled to an optimal value without increasing the cost.

The present invention provides a shift control system for an automatic transmission of a vehicle which controls the output of the engine according to the running condition of the vehicle when a gear-shifting operation of the automatic transmission is detected. In the present invention, a signal is generated representing an actual value of the running condition of the vehicle during a gear-shifting operation. In addition, a reference signal is output which represents a target value signal of the running condition during the gear-shifting operation. A correction signal is then output based on a comparison of the shifting condition signal and the target value signal. The engine output power is accordingly corrected, by correction of the controlled variable of the engine output power on the basis of a correction signal.

DESCRIPTION OF THE PREFERRED EMBODIMENT

Figure 1:
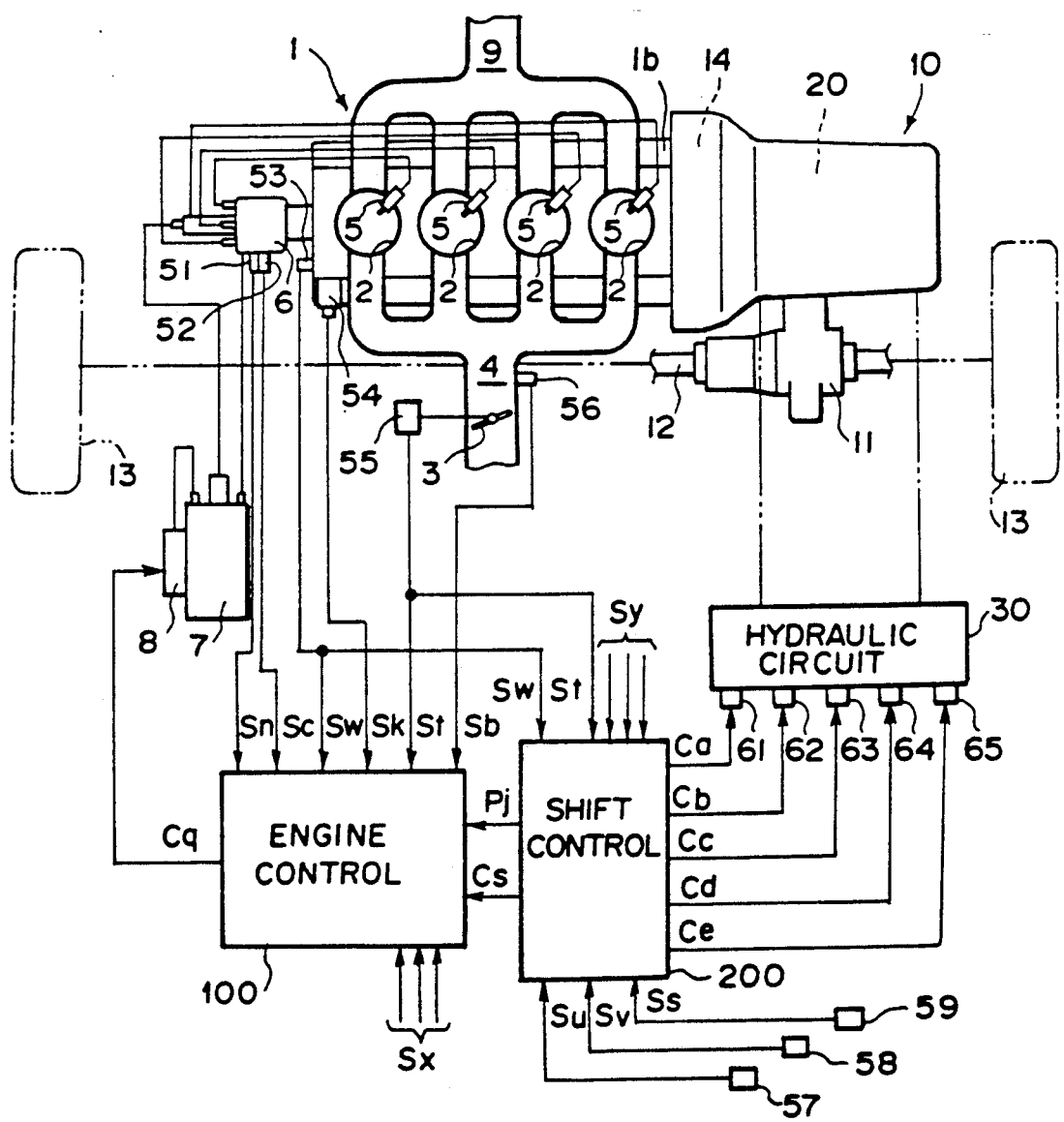
FIG. 1/is a schematic view showing a vehicle provided with a shift control system in accordance with an embodiment of the present invention.

In FIG. 1, a front-engine front-drive vehicle is provided with a shift control system in accordance with an embodiment of the present invention. An engine 1 has four cylinders 2 into which air-fuel mixture is fed through an intake passage 4. The intake passage 4 is provided with a throttle valve 3. Reference numerals 5 to 8 respectively denote spark plugs, a distributor, an ignition coil and an ignition controller which form an ignition system. Reference numeral 9 denotes an exhaust passage. The output power of the engine 1 is transmitted to an automatic transmission 10 through a crankshaft or the output shaft of the engine 1. The engine output torque thus transmitted to the automatic transmission 10 is further transmitted to front wheels 13 through a differential gear unit 11 and an axle 12.

The automatic transmission 10 has a torque converter 14, a multi-gear ratio transmission gear mechanism 20 and a hydraulic circuit 30 which provides hydraulic pressure to the torque converter 14 and the transmission gear mechanism 20. The transmission gear mechanism 20 has planetary-gear sets and provides four forward speeds and one reverse.

Further the vehicle is provided with an engine control unit 100 and a shift control unit 200.

Into the engine control unit 100, an engine speed sensor 51 inputs an engine speed signal Sn, a crank angle sensor 52 inputs a crank angle signal Sc, a water temperature sensor 53 provided on a cylinder block 1b inputs a water temperature signal Sw which represents the temperature of engine cooling water Tw, a knock sensor 54 inputs a knock signal Sk which represents the intensity of engine knock, a throttle position sensor 55 inputs a throttle opening signal St and an intake vacuum sensor 56 provided in the intake passage 4 downstream of the throttle valve 3 inputs an intake vacuum signal Sb. Further other signals Sx required for control of the engine 1 are input into the engine control unit 100. The engine control unit 100 sets an effective ignition advance angle according to those signals and shift-related ignition retardation pulse signal Pj and a shift information signal Cs which are input from the shift control unit 200, and outputs an ignition timing control signal Cq to the ignition controller 8 at the time which corresponds to the effective ignition advance angle. The secondary winding of the ignition coil 7 sends a high-voltage surge to the spark plugs 5 through the distributor 6 at the time corresponding to the ignition timing control signal Cq.

The shift control unit 200 receives the water temperature signal Sw from the water temperature sensor 53, the throttle opening signal St from the throttle position sensor 55, a turbine speed signal Su from a turbine speed sensor 57, a vehicle speed signal Sv from a vehicle speed sensor 58, and a range signal Ss representing th position of the shift lever from the shift position sensor 59. The shift control unit 200 further receives other signals Sy required for control of the automatic transmission 10. The shift control unit 200 develops drive signals Ca, Cb, Cc and Cd on the basis of those signals and selectively outputs the drive signals to solenoid valves 61, 62, 63 and 64 which regulate the hydraulic pressures applied to various clutches and brakes in the transmission gear mechanism 20, thereby causing the automatic transmission 10 to shift to a desired gear speed. Further the shift control unit 200 develops a drive signal Ce and selectively outputs it to a solenoid valve 65 which applies and releases hydraulic pressure to and from a lockup clutch.

Figure 2:
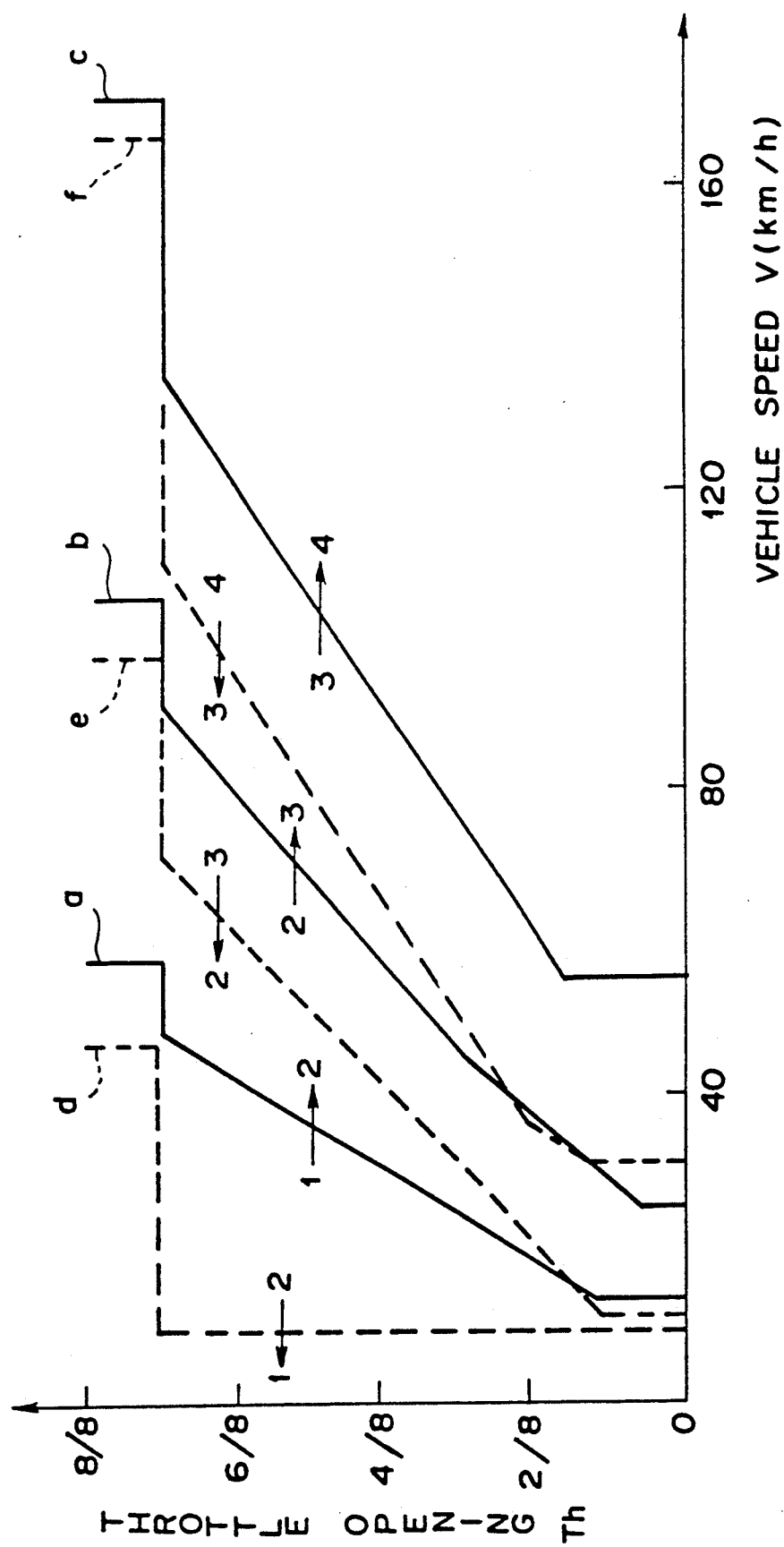
FIG. 2 is a shift pattern map.

The shift control unit 200 has a built-in memory and a shift pattern map shown in FIG. 2 is stored in the built-in memory. The shift control unit 200 refers the throttle opening Th and the vehicle speed V as respectively represented by the signals St and Sv to shift lines a, b, c, d, e and f, and determines whether the upshifting condition or the downshifting condition is satisfied. Further, the shift control unit 200 outputs to the engine control unit 100 the shift information signal Cs which represents the gear-speed to which the automatic transmission 10 is to shift and the final engine output torque reduction T by which the engine output torque is to be reduced. The shift lines a, b and c are 1-2, 2-3 and 3-4 upshift lines, respectively. The shift lines d, e and f are 2-1, 3-2 and 4-3 downshift lines, respectively.

The engine control unit 100 sets the basic ignition advance angle on the basis of the engine speed and the intake vacuum as represented by the signals Sn and Sb. Further, when the shift-related ignition retardation pulse signal Pj is fed to the engine control unit 100 from the shift control unit 200, the engine control unit 100 sets a shift-related correction value for retarding the ignition timing from the basic ignition timing which corresponds to the basic ignition advance angle, thereby suppressing shift shock which occurs in response to gear-shifting operation of the automatic transmission 10. Further, the engine control unit 100 determines a shift completion time correction value on the basis of the final engine output torque reduction T which is a correction signal obtained from the shift information signal output from the shift control unit 200, the shift completion time correction value being for correcting the shift-related correction value and thereby correcting the completion time of the gear-shifting operation. That is, the effective ignition advance angle is determined on the basis of the basic ignition advance angle, the shift-related correction value and the shift completion time correction value, and the completion time of the gear-shifting operation is adjusted according to the shift completion time correction value which is determined on the basis of the final engine output torque reduction T.

Figure 3:
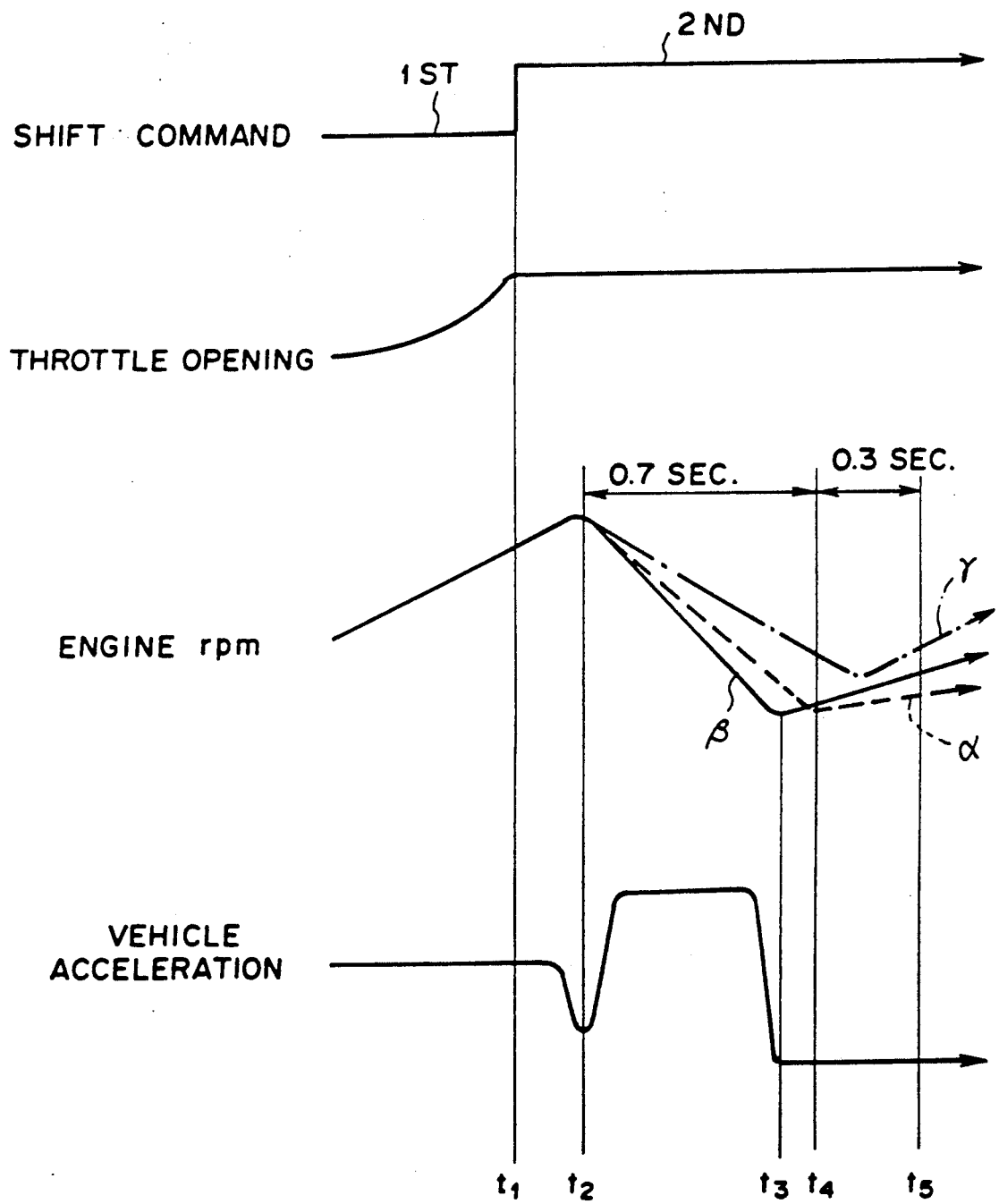
FIG. 3 is a time chart showing the relationship between the shift command signal, the throttle opening, the engine speed and the accelerator of the vehicle.

As will be described later, the final engine output torque reduction T is determined on the basis of a basic engine output torque reduction $T_B$ and a final learning value $\Delta T1$. The term learning value is utilized since the learning values are modified or adjusted according to whether the present engine output torque is too large or too small so that the final engine output torque T is optimally set. The basic engine output torque reduction $T_B$ is corrected according to the rate of change of the engine speed at the time a predetermined time after the start of the gear-shifting operation. This point will be described in more detail with reference to FIG. 4. In FIG. 3, curves $\alpha$, $\beta$, $\epsilon$ represent different manners of change of the engine speed after a 1-2 upshift command signal is generated.

When it is assumed that a 1-2 upshift command signal is selectively output to the solenoids 61, 62, 63 and 64 at time t1, due to the delay in response, the rate of change of the engine speed does not substantially change for a certain time after the time t1. At time t2, switching of the friction elements in the transmission gear mechanism 20 is actually started, that is, gear-shifting operation is actually started, and at the time t2, the engine speed which has been increasing begins to decrease. After the time t2, the switching of the friction elements progresses and the engine speed continues to decrease. The switching of the friction elements is completed at time t3, when the engine speed which has been decreasing comes to increase.

In this particular embodiment, the predetermined time, which determines the time the rate of change of the engine speed which is used for correcting the basic engine output torque reduction $T_B$, is 0.7 seconds. That is, in this particular embodiment, the basic engine output torque reduction Ts is corrected according to the rate of change of the engine speed at the time 0.7 seconds after the start of the gear-shifting operation (the time t2 in FIG. 3). The basic engine output torque reduction $T_B$ is corrected so that the switching of the friction elements is completed just at the time 0.7 seconds after the start of the gear-shifting operation. From this viewpoint, the curves $\alpha$, $\beta$, $\gamma$ are regarded as follows. The curve u indicates that the gear-shifting has been effected in an optimal manner. That is, the gear-shifting operation is completed at the time t4 and the rate of change of the engine speed becomes substantially 0 at the time t4. In other words, when the final engine output torque reduction T is optimally set, the engine speed changes in the manner shown by the curve $\alpha$. On the other hand, the curve $\beta$ indicates that the gear-shifting operation is prematurely completed before the time t4. In this case, the engine output torque is so small and slip of the friction elements is so small that the shift-time becomes too short. Accordingly, in this case, the basic engine output torque reduction $T_B$ is corrected so that the final engine output torque reduction T becomes smaller. The curve $\gamma$ indicates that the gear-shifting operation is competed after the time t4. In this case, the engine output torque is so large and slip of the friction elements is so large that the shift-time becomes too long. Accordingly, in this case, the basic engine output torque reduction $T_B$ is corrected so that the final engine output torque reduction T becomes larger.

That the gear-shifting operation is effected in which of the manners shown by the curves $\alpha$, $\beta$, $\gamma$ can be known by detecting the rate of change of the engine speed at the time t4. That is, that the rate of change of the engine speed at the time t4 is substantially 0 indicates that the gear-shifting is effected in the manner shown by the curve $\alpha$, which is the best. That the rate of change of the engine speed at the time t4 is of a positive value larger than a predetermined value indicates that the gear-shifting is prematurely completed (in the manner shown by the curve $\beta$), and that the rate of change of the engine speed at the time t4 is of a negative value smaller than a predetermined value indicates that the gear-shifting is completed too late (in the manner shown by the curve γ).

Figure 4:
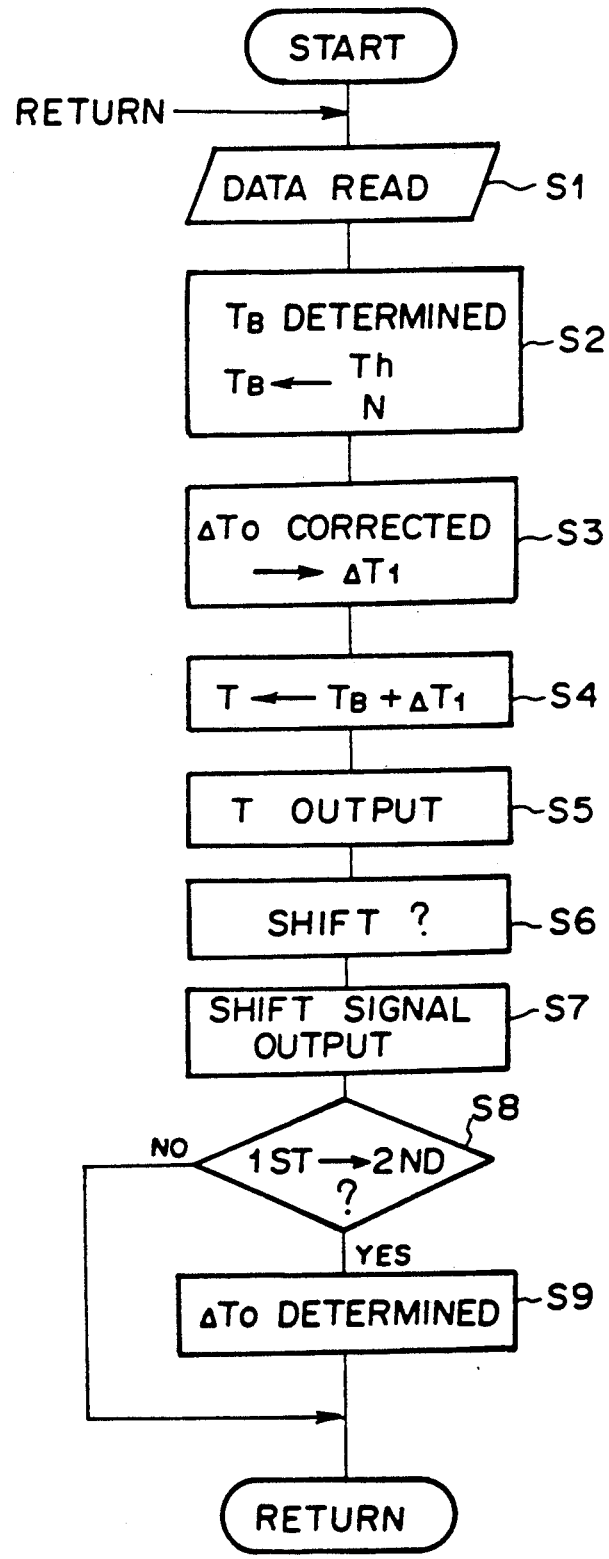
FIG. 4 is a flow chart showing the operation of the shift control unit.

The operation of the shift control unit 200 will be described with reference to the flow charts shown in FIGS. 4 and 5, hereinbelow.

In step S1, the shift control unit 200 reads the signals from the sensors. Then he shift control unit 200 determines the basic engine output torque reduction $T_B$ according to the map stored therein on the basis of the throttle opening Th and the engine speed N. (step S2).

In the next step S3, the shift control unit 200 corrects a basic learning value ΔTo (determined in the manner described later) according to the manner of gear-shifting operation and the throttle opening Th and determines the final learning value ΔT1. The basic learning value ΔTo is determined on the basis of the manners of gear-shifting operation in 1-2 upshift at a predetermined throttle opening Th (35 to 40% as will be described later), and in the case of the gear-shifting operations under other conditions, the basic learning value ΔTo is corrected by a correction coefficient (or a correction value) which is picked from a correction coefficient map stored in the shift control unit 200 in advance.

In step S4, the shift control unit 200 adds together the basic engine output torque reduction $T_B$ obtained in step S2 and the final learning value ΔT1 obtained in step S3 and calculates the final engine output torque reduction T. Then the shift control unit 200 outputs the final engine output torque reduction T to the engine control unit 100 in step S5. The engine control unit 100 determines the effective ignition advance angle on the basis of the final engine output torque reduction T upon receipt thereof.

In step S6, the shift control unit 200 determines whether the automatic transmission 10 is to be caused to shift according to the shift pattern map shown in FIG. 2. Then according to the result of the determination, the shift control unit 200 selectively outputs a shift command signal to the solenoid valves 61, 62, 63 and 64 in step S7.

In step S8, the shift control unit 200 determines whether 1-2 upshift is to be effected. When the answer to this question is NO, the shift control unit 200 directly returns to step S1, and otherwise the shift control unit 200 determines the basic learning value ΔTo in step S9.

Figure 5:
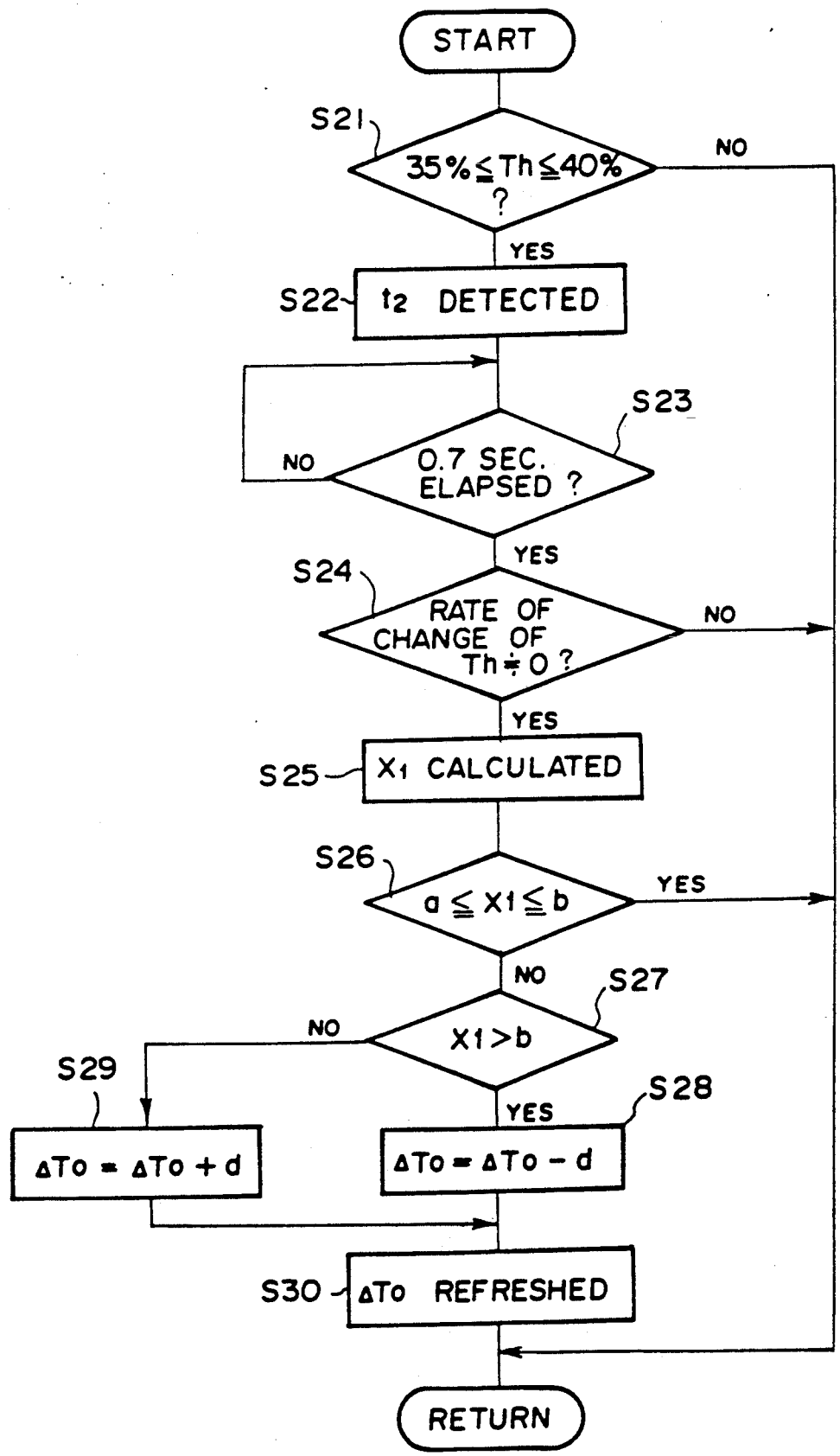
FIG. 5 is a flow chart showing in more detail the operation the shift control executes in step S9 in FIG. 4, and FIG. 6 i a flow chart showing a modification of a part of the flow chart shown in FIG. 5.

FIG. 5 is the flow chart illustrating in detail the operation of the shift control unit 200 for determining the basic learning value ΔTo in step S9. First the shift control unit 200 determines in step S21 whether the throttle opening Th is in the range of 35 to 40%, and when the throttle opening Th is in the range of 35 to 40%, the shift control unit 200 detects in step S22 the time t2 (FIG. 3) at which the gear-shifting operation is actually started. Then the shift control unit 200 determines 0.7 seconds after the time t2 (at the time t4 in FIG. 3) whether the change of the throttle opening Th at that time is substantially 0. (steps S22 and S23) In this particular embodiment, when the change of the throttle opening Th is no more than 3 to 4%, it is considered that the change of the throttle opening Th is substantially 0.

When the answer to the question in step S24 is YES, the shift control unit 200 calculates the rate of change X1 of the engine speed N at the time t4, and determines whether the rate of change X1 is within a predetermined range ($A \leq X1 \leq b$, $a<0$, $b>0$).) (steps S25 and S26) When the rate of change X1 is within the predetermined range, it is considered that the rate of change X1 is substantially 0.

When it is determined in step S26 that the rate of change X1 is not within the predetermined range, the shift control unit 200 further determines in step S27 whether the rate of change X1 is larger than the value b. That the answer to the question in step S27 is YES means that the gear-shifting operation is done in the manner represented by the curve β and the present engine output torque is too small. Accordingly, when the answer to the question in step S27 is YES, the shift control unit 200 subtracts a predetermined correction value d ($d>0$) from the present learning value ΔTo so that the final engine output torque reduction ratio T is reduced. (step S28) On the other hand, that the answer to the question in step S27 is NO means that the gear-shifting operation is done in the manner represented by the curve γ and the present engine output torque is too large. Accordingly, when the answer to the question in step S27 is NO, the shift control unit 200 adds the predetermined correction value d ($d>0$) to the present learning value ΔTo so that the final engine output torque reduction T is increased. (step S29)

The learning value ΔTo determined in step S28 or S29 is substituted for the current learning value and stored in step S30. The learning value ΔTo stored in step S30 is used for determining the final learning value ΔT1 in step S3 in FIG. 4.

That the answer to the question in step S26 is YES means that the present engine output torque is optimal. Accordingly, in this case, the shift control unit 200 directly returns as indicated in FIG. 4, ready for reading the next set of data signals from the sensors in subsequent shifting operations. When the answer to the question in step S21 or S24 is NO, the learning condition has not been satisfied, and accordingly, the shift control unit 200 returns to the position indicated in FIG. 4, without executing the learning steps.

Though, in the embodiment described above, the engine output power is adjusted by controlling the ignition advance angle in order to control the completion time of gear-shifting operation, the engine output power may be adjusted by controlling one or more of the quantity of fuel to be fed to the engine, the supercharging pressure and the quantity of intake air.

Figure 6:
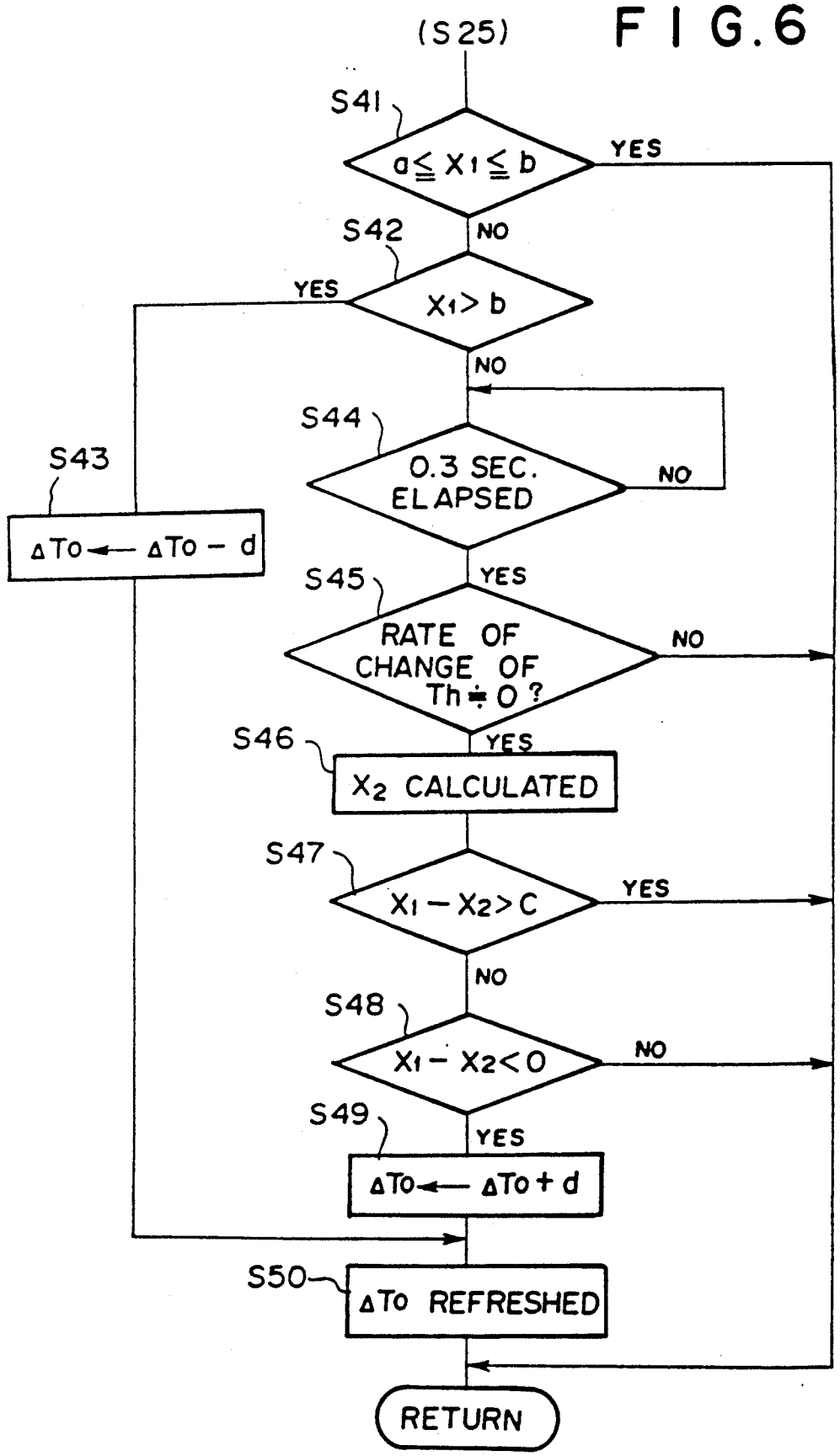

FIG. 6 shows a modification of the steps for determining the learning value ΔTo (steps S26 to S30 in FIG. 5). In the flow chart shown in FIG. 6, the learning value ΔTo is corrected by steps including steps S41, S42 and S43 when it is determined that the gear-shifting operation is done in the manner represented by the curve β. On the other hand, when it is determined that the gear-shifting operation is done in the manner represented by the curve γ, the learning value ΔTo is corrected on the basis of the rate of change X2 of the engine speed at the time 0.3 seconds after the time t4 (time t5 FIG. 3). This is because the manner of gear-shifting can be like that represented by the curve γ when the vehicle ascends a steep slope even if the line pressure is proper. That is, when it is determined that the gear-shifting operation is done in the manner represented by the curve γ, the shift control unit 200 calculates the rate of change X2 of the engine speed after 0.3 seconds lapses after the time t4 when the rate of change of the throttle opening Th is substantially 0. (steps S44, S45 and S46) Then the shift control unit 200 determines in step S47 whether the value obtained by subtracting the rate of change X2 of the engine speed at the time t5 from the rate of change X1 at the time t4 is larger than a predetermined value c. That is, in step S47, the shift control unit 200 determines whether the engine speed has not fallen between the time t4 and the time t5. When it is determined in step S47 that the value obtained by subtracting the rate of change X2 of the engine speed at the time t5 from the rate of change X1 at the time t4 is larger than the predetermined value c, the shift control unit 200 determines the vehicle is ascending a slope and directly returns without determining the learning value ΔTo.

When it is determined in step S47 that the value obtained by subtracting the rate of change X2 of the engine speed at the time t5 from the rate of change X1 at the time t4 is not larger than the predetermined value c, the shift control unit 200 determines in step S48 whether the remainder is smaller than 0. (In the case represented by the curve γ, the rate of change X1 is negative and the rate of change X2 is positive.) When the answer to the question in step S48 is YES, the shift control unit 200 sets the learning value ΔTo to the value obtained by adding the predetermined correction value d (d>0) to the present learning value ΔTo. (step S49) The learning value ΔTo determined in step S49 is stored in step S50.

As can be understood from the description above, in accordance with this embodiment, the time to be watched by a timer can be a predetermined particular time interval, e.g., a predetermined time interval after the start of gear-shifting operation, and accordingly, load on the control is minimized. Further, the engine speed sensor 51 for detecting the engine speed is normally provided in the automatic transmission, and accordingly additional detecting means is not required.

Though in the embodiment described above, said predetermined time is determined on the basis of the time at which the engine speed actually begins to change after the shift command signal is generated, the predetermined time may be determined on the basis of the time at which the shift command signal is generated. In such a case the predetermined time should be determined taking into account the delay in response.

Further instead of detecting the engine speed, other rotational speeds such as the rotational speed of the output shaft of the torque converter 14 may be detected.

I claim:

1. A shift control system for an automatic transmission of a vehicle which controls the output of the engine according to the running condition of the vehicle when a gear-shifting operation detecting means detects gear-shifting operation of the automatic transmission, comprising:

a shifting condition output means which outputs a shifting condition signal representing an actual value of the running condition during a gear-shifting operation, said shifting condition signal being detected after a predetermined time has passed from a commencement of the gear-shifting operation, a length of said predetermined time being set substantially equal to a time lapse which is required for completion of the gear-shifting operation so that delay or advance of mechanical response in the automatic transmission can be accurately detected.

a reference signal output means which outputs a reference value signal representing a reference value of the running condition during the gear-shifting operation, a correction signal output means which compares the shifting condition signal with the reference value signal and outputs a correction signal on the basis of the result of the comparison, and an engine output power correcting means which corrects the controlled variable of the engine output power on the basis of the correction signal, whereby torque shocks and slipping in the automatic transmission can be suppressed in accordance with the actual value of the running condition during the gear-shifting operation.

2. A shift control system as defined in claim 1 in which said actual value of the running condition during the gear-shifting operation is a rate of change of the engine speed at a predetermined time.

3. A shift control system as defined in claim 2 in which said predetermined time is a time at which the rate of change of the engine speed becomes 0 when the gear-shifting operation is completed in an optimal time.

4. A shift control system as defined in claim 3 in which the value of said correction signal is determined on the basis of whether the actual rate of change of the engine speed at the predetermined time is substantially 0 or deviates from 0.

5. A shift control system as defined in claim 4 in which the value of said correction signal, as determined on the basis of whether the actual rate of change of the engine speed at the predetermined time deviates from 0, is corrected according to the kind of the gear-shifting operation and the engine output power correcting means corrects the controlled variable of the engine output power on the basis of the corrected value of the correction signal.

6. A shift control system as defined in claim 4 in which when the rate of change of the engine speed at said predetermined time is smaller than 0, the value of said correction signal is determined on the basis of the deviation of the actual rate of change of the engine speed at the predetermined time from 0 only when the value obtained by subtracting the rate of change of the engine speed at the time a predetermined time after said predetermined time from the rate of change of the engine speed at said predetermined time is smaller than a predetermined value.

7. The shift control system of claim 1, wherein the reference signal output means outputs a pair of reference value signals, said pair including the first-mentioned reference value signal and a second reference value signal, such that a range of reference values is defined by reference values falling between the pair of reference value signals; and wherein the correction signal output means compares the shifting condition signal with the pair of reference value signals to determine whether the shifting condition signal is within the range of reference values, sand outputs a correction signal on the basis of whether the shifting condition signal is within the range defined by the pair of reference value signals.

* * * * *